United States Patent

Boullet

[11] Patent Number: 5,816,536
[45] Date of Patent: Oct. 6, 1998

[54] PROTECTIVE DEVICE INTENDED FOR INTEGRAL ATTACHMENT TO A LOAD ON A PARACHUTE WITH A VIEW TO PROTECTING THE SAID LOAD WHEN IT LANDS

[75] Inventor: Bernard Boullet, Fonsegrives, France

[73] Assignee: Centre National D'Etudes Spatiales (C.N.E.S.), France

[21] Appl. No.: 605,077

[22] PCT Filed: Aug. 16, 1994

[86] PCT No.: PCT/FR94/01010

§ 371 Date: Oct. 29, 1996

§ 102(e) Date: Oct. 29, 1996

[87] PCT Pub. No.: WO95/06585

PCT Pub. Date: Mar. 9, 1995

[30] Foreign Application Priority Data

Aug. 31, 1993 [FR] France ................................... 93 10543

[51] Int. Cl.⁶ .............................. B64D 1/14; B64D 17/22
[52] U.S. Cl. ..................................... 244/138 R; 244/137.3
[58] Field of Search ............................... 244/138 R, 109, 244/139, 137.3, 113

[56] References Cited

U.S. PATENT DOCUMENTS

| | | | |
|---|---|---|---|
| 2,944,771 | 7/1960 | Bush | 244/138 R |
| 2,952,336 | 9/1960 | Cushman | 244/138 R |
| 3,117,606 | 1/1964 | Hastings | 244/138 R |
| 3,117,752 | 1/1964 | Gillmore | 244/138 R |
| 5,039,036 | 8/1991 | Rogers | 244/138 R |

FOREIGN PATENT DOCUMENTS

| | | | |
|---|---|---|---|
| 678586 | 4/1930 | France | 244/138 R |
| 843985 | 7/1939 | France . | |
| 39 17 662 | 7/1993 | Germany . | |

*Primary Examiner*—Virna Lissi Mojica
*Attorney, Agent, or Firm*—Harold H. Dutton, Jr.

[57] ABSTRACT

A protective device for securing to a parachute-carried load to protect the same during landing, comprising a supporting base (2) for the load, a shield (6) extending around the periphery of the supporting base (2) and forming an upside down dome, with the supporting base forming the bottom thereof, a central deformable damping block (28) disposed under the supporting base (2), and a protective shield (29) for protecting the central damping block (28) arranged to support said element and linked to the strap (6) by means of high tensile cables (30) adapted to hold the central damping block (28) held between the supporting base (2) and the protective shield (29).

10 Claims, 3 Drawing Sheets

PROTECTIVE DEVICE INTENDED FOR INTEGRAL ATTACHMENT TO A LOAD ON A PARACHUTE WITH A VIEW TO PROTECTING THE SAID LOAD WHEN IT LANDS

The invention relates to a protective device intended for integral attachment to a load on a parachute with a view to protecting the said load when it lands.

BACKGROUND AND OBJECTS OF THE INVENTION

Numerous scientific missions, which are aimed particularly at exploration of the upper layers of the atmosphere or at astronomy, are currently carried out using nacelles fitted with specific scientific equipment, the ascent of which to very high altitudes is achieved by means of a space balloon and the return of which to the ground takes place on a parachute.

One of the requirements imposed by this type of mission lies in the need to protect the nacelles, and the often fragile equipment they are carrying, on landing. At the present time, this protection is generally achieved by providing the nacelles with a framework having four feet each constituted by a shock-absorbing stud and intended to partially absorb the impact on landing.

This solution proves reliable in the case of nacelles which are not very fragile and under favourable landing conditions (little wind at ground level and gently sloping terrain). When, on the other hand, one or more of these parameters proves unfavourable, it often happens that the shock-absorbing studs shear off and/or that the nacelle overturns, the result being in each case damage, which is often major, to the nacelle and to the equipment carried.

The present invention aims at alleviating these drawbacks and has, as its essential object, the provision of a device ensuring the effective protection, on landing, of a load on a parachute.

DESCRIPTION OF THE INVENTION

To this end, the invention relates to a protective device comprising:

a support base for the load, a shield extending over the circumference of the base and shaped in such a way as to form an inverted cupola of which the said base constitutes the bottom, means for integrally attaching the whole base/shield unit to the load, a crushable central shock-absorbing stud arranged under the base, a protective shield for the central shock-absorbing stud, which is arranged in such a way as to support the said stud and is linked to the shield by means of cables of high tensile strength which are distributed uniformly around the axis of the said shield and are adapted to keep the central shock-absorbing stud gripped between the base and the protective shield.

(It should be noted that the term "inverted cupola" is intended to define a shield having the shape, either of a cupola or of a flattened truncated cone, or any intermediate shape between these two extremes.)

This protective device therefore comprises, in the first place, a shield forming, at the base of the load, an inverted cupola which permits the whole unit, by elevation of its centre of gravity when it rocks, to rock without overturning on landing, before it returns to a position of vertical balance under the effect of its weight.

This shield therefore makes it possible to appreciably reduce the risk of overturning of the load when landing on sloping terrain or when the wind conditions are unfavourable.

The protective device comprises, in addition, a protective shield for the central shock-absorbing stud that constitutes, with the associated cables, a "bellows" permitting the said stud to be crushed freely while at the same time limiting its horizontal displacements in an optimum manner, thus ensuring the protection of the said stud against any risk of shearing-off on impact with the ground.

This protective shield therefore makes it possible to guarantee the shock-absorbing function devolving upon the central stud, thus protecting the load against excessively high decelerations.

Furthermore, this protective shield also performs the role of a skid for sliding on earthy or grassy ground, thus minimising the risk of the load overturning.

Compared with known devices, a protective device of this kind therefore makes it possible to appreciably reduce the risk of damage to loads when they land.

According to another feature of the invention, the protective device comprises secondary shock-absorbing studs distributed underneath the shield in the intermediate portions of the latter's width.

Studs of this kind have the double function of absorbing the impact when the load rocks and of avoiding direct contact between the edges of the base and the ground.

Moreover, the protective shield advantageously has the shape of a truncated cone with a flat bottom. The aim of a shape of this kind is to facilitate the sliding of the said shield when landing on sloping or loose terrain or when an inclination of the load occurs which is due, for example, to swinging of the latter on the parachute.

According to another feature of the invention, the shield is made up of inclined, rigid ribs distributed over the circumference of the base, and of connecting elements connecting the said ribs to one another.

In the first place, a shield structure of this kind has the double advantage of being light and of offering a very good compromise in terms of weight/efficiency.

Furthermore, a shield of this kind constitutes a deformable system which is therefore suitable for absorbing impacts in the event of landing on a terrain having a major declivity or when an obstacle is encountered.

Finally, in the eventuality of overturning of the load, followed by dragging of the latter by the parachute, the ribs are able to act as an anchor.

Moreover, according to another feature of the invention, the whole shield/base unit has, in longitudinal section, the shape of an arc of a circle:

the maximum diameter D of which is such that $$D \geq 2\sqrt{\left(\frac{vo^2}{2g} + ho\right)^2 - (ho-a)^2} \quad \text{where:}$$

ho is the height of the centre of gravity of the load equipped with the protective device, in relation to the ground, in the crushed configuration of the central shock-absorbing stud, a is the height of the inverted cupola in relation to the ground, in the crushed configuration of the central shock-absorbing stud, and vo is the wind speed at ground level, and the radius of curvature R of which is such that $$R = \frac{D^2}{8a} + \frac{a}{2}.$$

Other characteristics, aims and advantages of the invention will emerge from the detailed description given below, with reference to the attached drawings which represent, by way of a non-limitative example, a preferred mode of embodiment thereof. In these drawings, which form an integral part of the present description:

DESCRIPTION OF PREFERRED EMBODIMENTS

Figure 1:
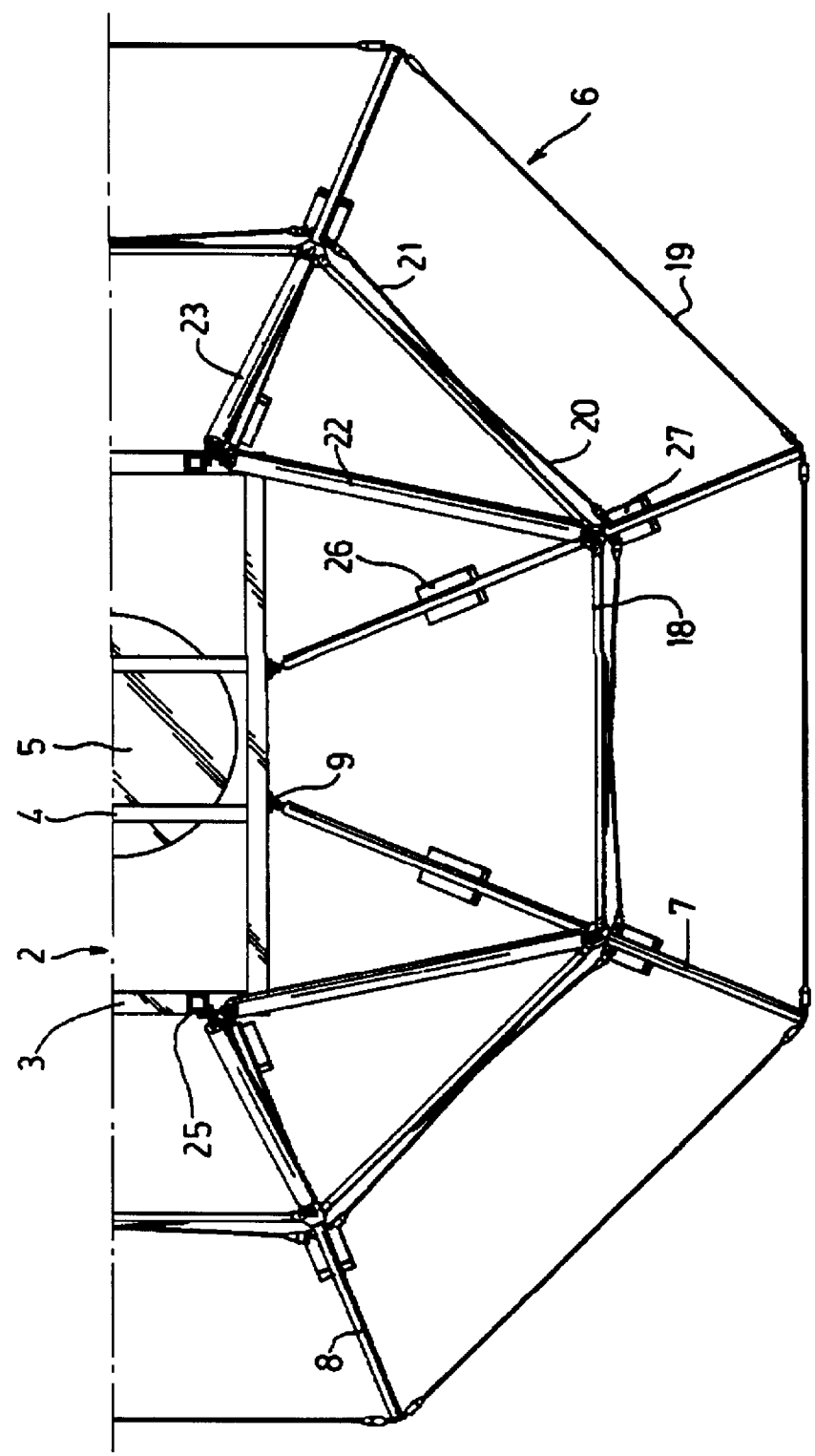
FIG. 1 is half-view, from above, of a protective device according to the invention.
Figure 2:
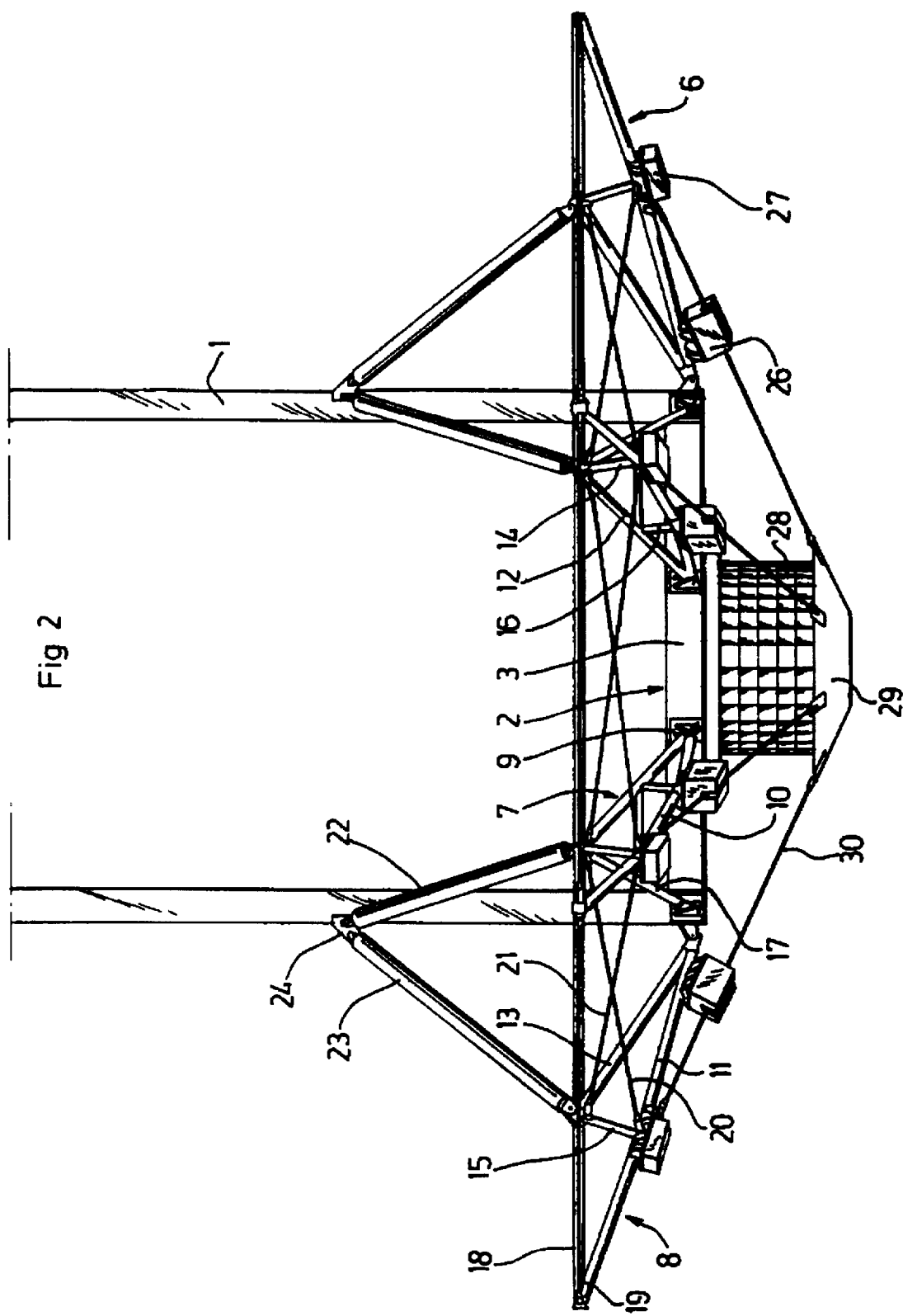
FIG. 2 is a view, in elevation, of this device, fitted to a load of which only the circumference is diagrammatically represented.

The protective device represented in FIGS. 1 and 2 is intended for integral attachment to a load 1 on a parachute, which load is represented in a highly diagrammatic form in FIG. 2, with a view to protecting the said load when it lands. This device can be used with any type of load, and particularly with re-usable scientific nacelles.

This device comprises, in the first place, a base 2 which supports the load 1 and has a rectangular tubular frame 3, the large sides of which are connected, at a distance from their ends, by two cross-pieces such as 4.

This base 2 also has a circular plate 5 which is made of laminated material with a honeycomb core and is fixed underneath the cross-pieces 4 in such a way that its axis of symmetry is coaxial with that of the tubular frame 3.

In addition, the protective device has a shield 6 extending over the circumference of the base 2 in such a way as to form an inverted cupola, of which the said base constitutes the bottom.

This shield 6 is made up, in the first place, of eight ribs such as 7, 8 which are inclined upwards in relation to the base 2. These ribs 7, 8 extend radially in relation to the axis of symmetry of the base 2 and are uniformly distributed around the said axis.

Each of the ribs 7, 8 is fixed onto the outer face of one of the sections of the tubular frame 3 via a fitting such as 9.

Furthermore, the length of each rib 7, 8 is adapted so that the distance between the end of each of the said ribs and the axis of symmetry of the base 2 is identical and equal to a predetermined value D/2. In the example, and by reason of the rectangular shape of the base 2, observance of this condition leads to the production of two different lengths of ribs, the four ribs 7 fixed onto the large sides of the base 2 having a length greater than that of the ribs 8 fixed onto the small sides of the said base.

In addition, the ribs 7, 8 have a tubular structure and are made up of a lower strut, 10, 11 respectively, and an upper strut, 12, 13 respectively, giving them a triangular longitudinal shape, and of a stay, 14, 15 respectively, connecting the said struts at right angles to the top of the triangle.

Furthermore, the ribs 7 of greater length have a second stay 16. Moreover, these ribs 7 are associated with triangulation bars 17 extending between the top of the said ribs and the tubular frame 3, substantially at right angles to one of the angles of the said frame.

In the second place, the shield 6 comprises connecting elements connecting the various ribs 7, 8 to one another.

These connecting elements have, in the first place, connecting bars such as 18 connecting the upper struts 12, 13 of the ribs 7, 8 at right angles to the top of these latter. They also comprise cables such as 19, which are of high tensile strength and are made, for example, of "Kevlar", connecting the free ends of the ribs 7, 8.

The connecting elements finally comprise cables such as 20, 21 of high tensile strength, such as cables made of "Kevlar", which are arranged crosswise between two contiguous ribs 7, 8 at right angles to the top of these latter, so as to each connect the upper strut 12, 13 of one rib 7, 8 to the lower strut 10, 11 of another rib. These "crosswise" cables 20, 21 have the function of preventing warping of the ribs 7, 8 under pressure from the ground.

The protective device has, moreover, recovery bars such as 22, 23 connecting the shield 6 to the load. In the example, these recovery bars 22, 23 are disposed in twos so as to form a V which is inclined in relation to the vertical. These bars 22, 23 are fixed, towards one of their ends, onto the top of the upper struts 12, 13 of two contiguous ribs 7, 8, and are connected, towards their other end, by a fitting 24 which is suitable for integral attachment to the load.

In the example, each pair of recovery bars 22, 23 extends between the top of the upper struts 12, 13 of two ribs 7, 8 and a corner upright, such as 25, of the load.

The protective device has, moreover, so-called "secondary" shock-absorbing studs such as 26, 27, and a central stud 28.

All these shock-absorbing studs 26, 27, 28 are produced in a material such as cardboard honeycomb reinforced by means of strengthened adhesive tape.

The secondary studs 26, 27 number two per rib 7, 8 and are integrally attached, underneath plates made of laminated material with a honeycomb core and bolted underneath the lower strut 10, 11 of the said ribs, level with a section close to the base 2, and at right angles to the top of the said ribs, respectively.

The undersurface of the secondary studs 26 which are close to the base 2 is, in addition, provided with a longitudinal notch suitable for accommodating a cable such as is described above.

As for the central stud 28, this is of octagonal shape. It is arranged under the plate 5 of the base 2 and has the same diameter as the said plate.

This central stud 28 is retained by a protective shield 29 made of stainless steel sheet in the shape of an octagonal truncated cone with a flat bottom, which is arranged underneath the said stud, and by cables such as 30 of high tensile strength, such as cables made of "Kevlar", which connect the said shield to the shield 6.

These cables 30 are eight in number and each extend radially between the periphery of the protective shield 29 and the lower strut 10, 11 of a rib 7, 8, substantially at right angles to the top of the said rib.

These cables 30 are, in addition, equipped with a tensioning system (not represented) which makes it possible to press the protective shield 29 firmly against the lower face of the central stud 28 on assembly.

Figure 3:
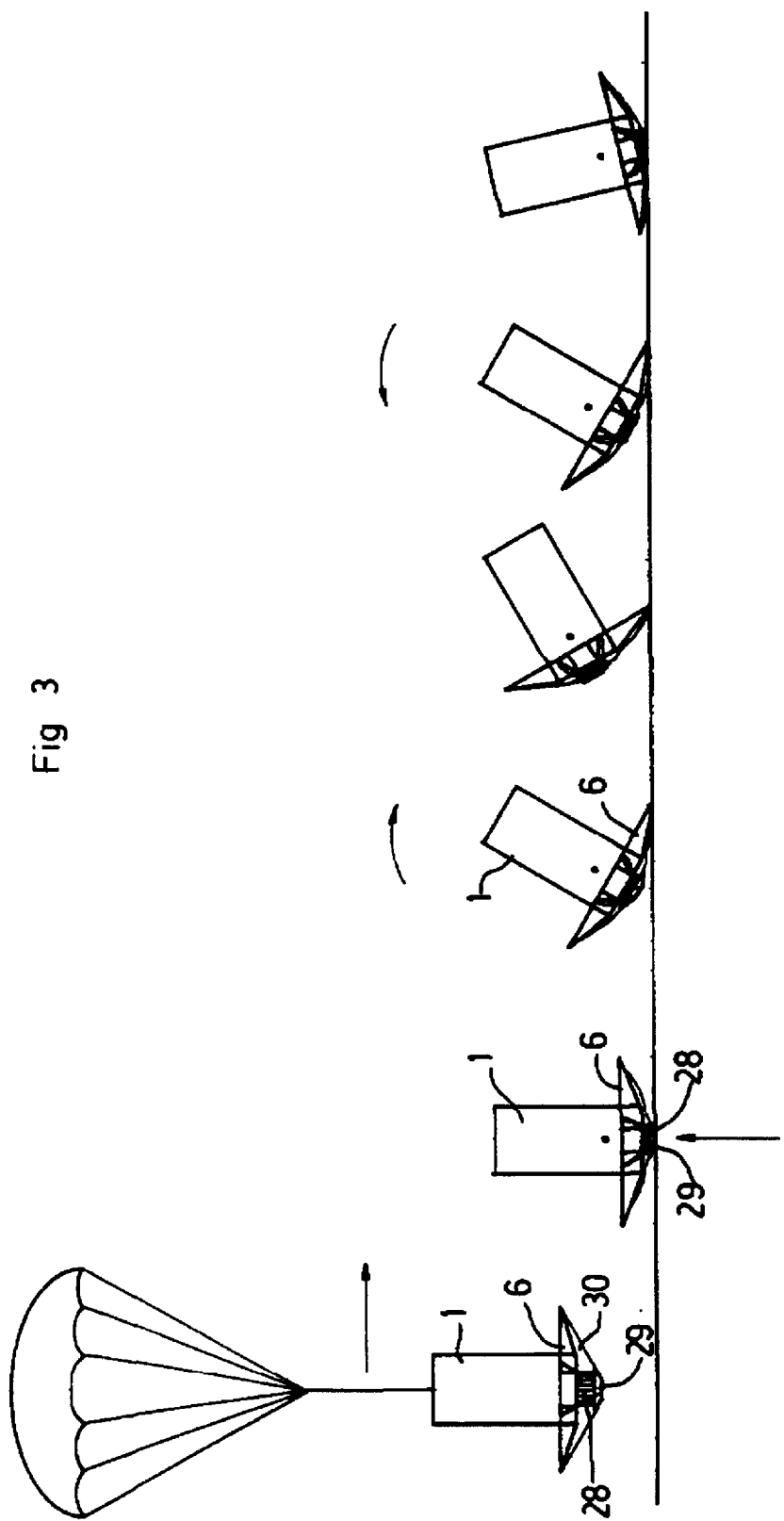
FIG. 3 represents, in diagrammatic form, the various phases in the landing of a load fitted with a protective device according to the invention, with a high wind speed at ground level.

As illustrated in FIG. 3, when a load equipped with a protective device according to the invention lands, in a side wind, and once the central stud 29 has been crushed, the said load is induced to rock, without impact thanks to the presence of the shield 6, before regaining its balance.

Protection of the load is thus doubly guaranteed because of the presence, on the one hand, of the whole shield 29/ cables 30 unit, which prevents the possible shearing-off of the central stud 28, and because of the presence, on the other hand, of the shield 6 which allows the load to rock without overturning.

I claim:

1. A protective device for integral attachment to a load (1) on a parachute for protecting said load when it lands, said device comprises:

a support base (2) for the load (1), a shield (6) extending over the circumference of the base (2) and shaped in such a way as to form an inverted cupola of which said base constitutes the bottom, means for integrally attaching said base (2) and shield (6) unit to the load (1), a crushable central shock-absorbing stud (28) arranged under the base (2), a protective shield (29) for the central shock-absorbing stud (28), which is arranged in such a way as to support said stud and connected to said shield (6) by means of high tensile strength cables (30) distributed uniformly around the axis of the said shield for keeping the central shock-absorbing stud (28) gripped between the base (2) and the protective shield (29).

2. A protective device as in claim 1, wherein the said device comprises secondary shock-absorbing studs (26, 27) distributed underneath said shield (6) intermediate the width thereof.

3. A protective device as in claim 2, wherein each shock-absorbing stud (26–28) is made of a reinforced cardboard honeycomb material.

4. A protective device as claimed in claim 3, wherein said protective shield (29) has the shape of a truncated cone with a flat bottom.

5. A protective device as claimed in claim 3, wherein said shield (6) is made of inclined, rigid ribs (7, 8) distributed over the circumference of the base (2), and connecting elements (18–21) connecting said ribs to one another.

6. A protective device as claimed in claim 5, wherein:

each rib (7, 8) has a tubular structure and comprising a lower strut (10, 11) and an upper strut (12, 13), giving it a triangular longitudinal shape, and a stay (14, 15) connecting the said struts at right angles to the top of the triangle, said connecting elements (18–21) having connecting bars (18) for connecting the upper struts (12, 13) of the ribs (7, 8) at right angles to the top of said ribs, and high tensile strength cables (19) connecting said ribs at the opposite end thereof from the base (2).

7. A protective device as in claim 6, wherein the connecting elements (18–21) comprise high tensile strength cables (20, 21) arranged crosswise between two contiguous ribs (7, 8) so as to each connect the upper strut (12, 13) of one rib (7, 8) to the lower strut (10, 11) of another rib (8, 7).

8. A protective device as claimed in claim 7, wherein said cables (30) are arranged between the protective shield (29) and the shield (6) so as to connect said shield to the lower strut (10, 11) of a rib (7, 8) at right angles to the top of the said rib.

9. A protective device as claimed in claim 6 wherein said means for integrally attaching said base (2) and said shield (6) unit to the load (1) comprises recovery bars (22, 23) disposed in pairs so as to form a V which is inclined in relation to the vertical, the said bars being fixed at one of their ends onto the top of the upper struts (10,11) of two contiguous ribs (7, 8), and being connected near their upper end by a fitting (24) for integral attachment to the load (1).

10. A protective device as claimed in claim 1, wherein said shield and (6) base (2) unit has, in longitudinal section, the shape of an arc of a circle the maximum diameter D of which is such that $$D \geq 2\sqrt{\left(\frac{vo^2}{2g} + ho\right)^2 - (ho - a)^2} \quad \text{where:}$$

ho is the height of the center of gravity of the load (1) equipped with the protective device, in relation to the ground, in the crushed configuration of the central shock-absorbing stud (28), a is the height of the inverted cupola in relation to the ground, in the crushed configuration of the central shock-absorbing stud (28), vo is the wind speed at ground level, and the radius of curvature R of which is such that.

$$R = \frac{D^2}{8a} + \frac{a}{2}.$$

* * * * *